United States Patent Office 3,010,908
Patented Nov. 28, 1961

3,010,908
FLUORESCENT PLASTIC SCINTILLATORS
Edward Broderick, Perkasie, Philip Bernstein, Philadelphia, and Samuel Loshaek, Hatboro, Pa., assignors, by mesne assignments, to the United States of America as represented by the United States Atomic Energy Commission
No Drawing. Filed Dec. 30, 1959, Ser. No. 862,779
5 Claims. (Cl. 252—301.2)

This invention relates to scintillators and particularly to new primary absorbers for use therein.

The scintillators are useful in detecting and measuring nuclear ionizing radiations such as beta and gamma.

Scintillators of this class ordinarily include three classes of materials as follows: a primary absorber sometimes called the solvent which absorbs the ionizing radiation and converts a part of it to useful molecular excitation energy; the solute or primary fluor which receives the energy from the said absorber and transfers it to the wave shifter; and a wave shifter which converts the energy so received to visible light of the wave length desired for final measurement. Ordinarily these three classes make either a liquid or a solid solution. Our invention is particularly useful in making a desirable plastic product.

The effectiveness of a scintillator in converting a fixed quantity of ionizing radiation to visible light is measured by well known nuclear counting devices and is expressed as a voltage pulse height which is directly related to the amount of visible light received from said scintillator. Common practice is to express the observed pulse height as a percentage of the pulse height obtained with an anthracene crystal of the same dimensions under the same conditions, i.e., anthracene crystal is given the value of 100.

Extensive research has developed scintillators to the stage at which their effectiveness, as measured by their pulse heights on this scale, has reached the range 40–50. In an effort to go above this range substantially, there has been resort to the use of solutes or of wave shifters, particularly the latter, that are rare and expensive. In spite of such efforts, however, there has been developed no reasonably economical 3-component scintillator composition of pulse height substantially above 50.

The present invention provides new and relatively inexpensive primary absorbers which, when used with common primary fluors and wave shifters, have given pulse heights at least as high as those previously obtained with the more costly auxiliary materials and, in certain combinations, have raised the pulse height to within the range 53–69.5. The invention provides also plastic copolymer primary absorbers which are in many instances more effective than the homopolymers of any of the monomers represented in the copolymer under test.

Because our new materials are not only more effective but also substantially lower in density than the anthracene standard, the pulse heights obtained with our primary absorbers, for a given weight of specimen, are as high as 90.

Briefly stated, the invention comprises scintillator compositions having as the solvent, i.e., primary absorber of the incident nuclear radiation, poly(di-alkyl styrene), and poly(alkaryl styrene), or copolymers of the monomers represented in these polymers either with each other, or with styrene or monoalkyl ring substituted styrenes such as vinyl toluene, ethyl styrene, or alphamethyl styrene.

The invention comprises the chemical compounds di-alkyl substituted styrenes, the alkyls having 1–3 carbon atoms, and the benzyl substituted styrenes.

The substitution product of styrene, constituting part or all of the solvent or primary absorber of the radiation in our scintillator composition, is represented by the following formulas:

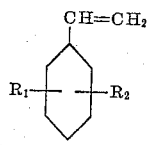

(I)

and

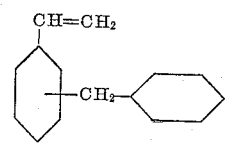

(II)

$R_1$ and $R_2$ represent alkyl groups which may be the same or different and have 1–3 carbon atoms, i.e., methyl, ethyl, isopropyl and propyl groups.

In the Formulas I and II the substituent groups may be at any of the available aromatic ring positions.

Examples of the dialkyl styrenes that we can use as scintillator solvents (primary absorbers) are 2,3-, 2,4-, 2,5-, 2,6-, 3,5- and 3,4-dimethyl styrene and the corresponding diethyl, dipropyl and diisopropyl derivatives. Examples of the benzyl substituted styrenes that we use are the 4-benzyl, 2-benzyl, and 3-benzyl styrene.

In practice it is very difficult and commercially not feasible to prepare the monomers of this invention in an isomerically pure form or to separate isomeric mixtures of such monomers into their pure isomeric constituents. Thus, the synthetic method employed here and described in subsequent examples may lead to a mixture of isomeric substituted styrenes even though starting materials of very high isomeric purity are employed. For example, the method starting with 1,2-dimethyl benzene gives a mixture of 2,3-dimethyl styrene and 3,4-dimethyl styrene, the former isomer being present in minor but substantial proportion. The same method, used to prepare a mixture of dimethyl styrenes from equal parts by weight of 1,2-dimethyl benzene and 1,4-dimethyl benzene, gives a mixture which consists predominantly of 2,3-, 3,4- and 2,5-dimethyl styrene. In starting with such mixed isomers, we use at least 5% of each on the weight of the mixed isomers. When the starting material consists essentially of a single species, with only minor proportions of isomers, we call the final product a homopolymer. The products obtained finally by mixing the isomeric starting materials and proceeding through the polymerization stage we refer to as copolymers.

When 1,4-dimethyl benzene is converted to dimethyl styrene, 2,5-dimethyl styrene is obtained exclusively.

Variations in copolymer composition can be made by mixing one or more of the foregoing monomeric products with each other or with other monomers and then copolymerizing as described herein.

Examples of homopolymer or copolymer solvents that give greater pulse heights than obtainable heretofore, with polyvinyl toluene as the solvent and with comparable solutes and wave shifters, are shown in the following table.

All pulse height readings for this table and elsewhere herein were taken with a scintillation counter, 0.01 microcurie of a $Pa^{234}$ beta source, and a 6291 Du Mont photomultiplier tube. Unless stated to the contrary the data are on an equal dimension basis of our scintillator and of the standard anthracene crystal taken as 100.

TABLE 1

*Relative pulse heights of scintillators* [1]

[Prepared with substituted styrenes as primary absorber (anthracene =100)]

| Test No. | Substituted Styrene Monomer Used | Primary Absorber | | |
|---|---|---|---|---|
| | | Polymer of the Substituted Styrene | 1:1 Copolymer with Vinyl Toluene [2] | 1:1 Copolymer with Styrene [2] |
| a | 3,4-dimethyl [3] | 60.7 | | 61.0 |
| b | 2,4-dimethyl [4] | 48.4 | 51.6 | 52.6 |
| c | 2,5-dimethyl | 53.0 | 57.0 | 55.6 |
| d | p-benzyl [5] | | 55.6 | 54.0 |
| e | (51% 2,4-dimethyl [6] 17% 3,4-dimethyl 32% 2,5-dimethyl | 69.5 | | |
| f | diethyl styrene [7] | 48.0 | 50.5 | 58.0 |

[1] The whole plastic scintillator tested consisted of the primary absorber solvent plus 2.0% of PTP (p-terphenyl) in test *b* and *e* and 3% in all others along with 0.05% POPOP, i.e., 1,4-di-[2-(5-phenyloxazolyl)]-benzene, in all tests, to give a total with the primary absorber of 100%. POPOP may be called 2,2-p-phenylenebis(5-phenyloxazole).
[2] A copolymer consisting of equal parts by weight of the substituted styrene in the second column on the left and vinyl toluene (4th column) or styrene (5th column).
[3] Probably contains minor amounts of 2,3-dimethyl styrene.
[4] Probably contains minor amounts of 3,5 and 2,6-dimethyl styrene.
[5] The homopolymer of this monomer was too soft to give a useable plastic scintillator; therefore data is reported for copolymers with vinyl toluene and styrene only.
[6] The indicated percent by weight of the monomers in this mixture were determined by gas chromatographic analysis.
[7] This monomer was prepared by the methods described hereafter starting with a mixture containing 60 parts by weight of m-diethyl benzene, 30 parts by weight of p-diethyl benzene and 10 parts by weight of o-diethyl benzene.

It is to be noted from Table 1 that some of the substituted styrenes give high relative pulse heights when used as the sole monomer in the preparation of the polymeric primary absorber whereas others give higher pulse heights when copolymerized with other monomers.

With our primary absorber we use any one of the conventional solutes (primary fluors) including the following: p-terphenyl (PTP), m-terphenyl, trans-stilbene, anthracene, 2-phenyl-5-(4-biphenyl)-1,3,4-oxidiazole, 2,5-diphenyloxazole, p,p′-quaterphenyl, 1,1,4,4-tetraphenyl-1,3-butadiene, naphthalene, 2,5-di-(4-biphenylyl)-oxazole; 2-(1-naphthyl)-5-phenyloxazole, and 1,3,5-triaryl-2-pyrazolines including 1,3,5-triphenyl-2-pyrazoline, 1,3-diphenyl-5-p-acetoamidophenyl - 2 - pyrazoline, 1,3-diphenyl-5-p-hydroxyphenyl - 2 - pyrazoline, 1,5-diphenyl-2-p-methoxyphenyl-2-pyrazoline, 1 - phenyl-3,5-di-p-methoxyphenyl-2-pyrazoline, 1,3-diphenyl-5-p-methoxyphenyl-2-pyrazoline, and 1,3-diphenyl-5-p-biphenyl-2-pyrazoline.

Wave shifters that we use are also any that are conventional including 1,1,4,4-tetraphenyl-1,3-butadiene, 1,4-di-[2-(5-phenyloxazolyl)]-benzene (POPOP), diphenyl stilbene, and 1,3,5-triaryl-2-pyrazoline, the latter being both a primary fluor and a wave shifter. When a material is both a primary fluor and a wave shifter, then our scintillator may consist of the primary absorber and the said material.

Proportions that we can use are shown in the following table in which one column shows the permissible range and another shows the range recommended for commercial use.

TABLE 2

| | Parts by Weight for 100 of Primary Absorber | |
|---|---|---|
| | Permissible | Commercial |
| Primary fluor (solute) | From 0.05 to the limit of solubility in the primary absorber. | 1-5 |
| Wave shifter | 0.005-1 | 0.02-0.1 |

The primary absorber, solute, and wave shifter are compounded in any usual commercial manner, as, for instance, by mixing the three ingredients at a temperature at which the composition is fluid during the mixing and then cooling until it sets to solid plastic condition. A more satisfactory compounding procedure, however, is to mix the monomer or comonomers, to be represented in the polymer or copolymer solvent, with the solute and wave shifter and then to polymerize or copolymerize the monomer or monomers in contact with the other components.

The preparation of the monomers from which the primary absorbers herein described are obtained by polymerization effected by methods heretofore used for compounds of the same general class. The aryl compound selected as the starting material for the preparation of the monomer contains the alkyl substituents that are to appear in the final product.

The methods employed and our compositions are further illustrated in the following specific examples. In these examples and elsewhere herein, proportions are expressed as parts by weight unless specifically stated to the contrary.

EXAMPLE 1

One hundred parts of 1,4-dimethylbenzene were added, over a 3 hour period, to a solution of 104 parts of acetyl chloride and 172 parts of aluminum chloride in 2 liters of anhydrous carbon tetrachloride maintained at a temperature of 0° C. Thereafter the reaction mixture was stirred at 0° for one hour, then allowed to come to room temperature and poured over a mixture of 3 kg. of ice and 318 parts of 37% hydrochloric acid. The resulting liquid so acidified, to remove any residual aluminum chloride, was placed in a separating funnel and the lower organic phase was separated, washed successively with 5% hydrochloric acid, sodium carbonate solution, and water until neutral. It was then dried over anhydrous magnesium sulfate. The carbon tetrachloride was removed under vacuum at 50° C. and the residue was distilled through a 2 ft. Vigereux column to give 2,5-dimethylacetophenone (B.P. 110-115° C. at 12 mm.) in 82% yield (based on the 1,4-dimethylbenzene used).

The 2,5-dimethylacetophenone was reduced to 2,5-dimethylphenylmethylcarbinol by adding 100 parts of the 5-dimethylacetophenone to 2.5 liters of anhydrous isopropanol and 142 parts of aluminum isopropoxide and heating to reflux until acetone could no longer be removed by distillation. One and one half liters of isopropanol were removed under vacuum at 40° C. and the remaining mixture was poured over a mixture of 2 kg. of ice and 280 parts of 37% hydrochloric acid. The resulting aqueous suspension was extracted in a separating funnel four times with 300 cc. portions of toluene. The extracts were washed with 5% hydrochloric acid, sodium bicarbonate solution and water until neutral and then dried over magnesium sulfate. The toluene was stripped off under vacuum at 40° C. and the residue was fractionally distilled, to give 2,5-dimethylphenylmethylcarbinal (B.P. 88-89° at 1 mm.) in 93% yield (based on the 2,5-dimethylacetophenone).

The 2,5-dimethylphenylmethylcarbinol was dehydrated by passing it through a column of aluminum oxide at 300° C. This product was died over magnesium sulfate and then distilled at reduced pressure to give 2,5-dimethylstyrene (B.P. 55° C. and 1 mm.). The monomer was then filtered through a long tube of chromatographic grade aluminum oxide at room temperature. The 2,5-dimethylstyrene so obtained is a liquid of refractive index at 25° C. of 1.5372. The yield obtained was 79% (based on the 2,5-dimethylphenylmethylcarbinol).

The same procedure was repeated exactly except that a commercial grade of xylene was substituted for the 1,4-dimethylbenzene. The commercial xylene contained the following materials in the percentages shown: orthoxylene 23.8, metaxylene 43.4, para-xylene 10.8, ethyl benzene 20.8, toluene 1.1, and benzene 0.1.

This 2,5 isomer and, separately, the mixed isomers were polymerized or copolymerized as described elsewhere herein and the polymerized material compounded into scintillators.

Thus 100 parts of vinyl xylene (any of the isomeric vinyl xylenes discussed or mixtures thereof), 2 parts of PTP and 0.05 part of POPOP were charged to a polymerization vessel, consisting of a 25 mm. inside diameter Pyrex tube with a 10 mm. inside diameter tube sealed on one end, the vessel evacuated to 1 mm. Hg pressure through the 10 mm. tube and then sealed under vacuum. The charge was then held at 100° C. for 3 days followed by a 6 hour period at 170° C. The whole was cooled slowly to room temperature, the vessel opened, the plastic therein milled down and polished to a disc 25 mm. in diameter and 13 mm. thick. One face of this disc was placed in optical contact with a Du Mont 6291 photomultiplier tube and on the other face was placed a $Pa^{234}$ microcurie source, the whole assembly being in a light tight enclosure. The light pulses from the scintillator resulting from the beta radiations of the source are converted to voltage pulses by the photomultiplier tube and then amplified and passed through a voltage bias which transmits only voltage pulses greater than a desired value, the latter pulses then being counted with a conventional counter. The voltage bias required to give an arbitrary number of pulses per minute is referred to as the pulse height. The value of the pulse height obtained by replacing the plastic scintillator with an anthracene crystal of the same dimensions is taken as 100. The value of the pulse height of the plastic divided by that of the anthracene crystal is the relative pulse height. This scintillator containing 2% p-terphenyl and 0.05% POPOP had a relative pulse height of 53 when the primary absorber was made from the polymer of vinyl-2,5-dimethylbenzene and 69.5 when it was the copolymer of the mixture of vinyl xylenes obtained from the commercial xylene described herein.

Other dialkyl styrenes are made in the manner illustrated for the preparation of 2,5-dimethylsyrene, any other isomeric dimethyl or other dialkylbenzene, being substituted in equimolar proportion for the 1,4-dimethyl benzene used above. Products so made and their action in scintillators are shown in Table 1 above.

EXAMPLE 2

Para-benzylstyrene was prepared as follows:

One hundred parts of benzyl chloride was added in 1.5 hrs. to a mixture (maintained at 10° C.) of 445 parts of benzene and 126 parts of aluminum chloride. One hour after the addition was complete the mixture was treated with 500 cc. of ice water, while being stirred vigorously. The organic phase was separated, washed successively with 5% hydrochloric acid, 5% sodium hydroxide solution and water until the wash water was neutral. The excess benzene was removed at 40° C. under reduced pressure and the residue was distilled to give diphenylmethane (B.P. 140–145° C. at 25 mm.) in 64% yield. The diphenylmethane was (1) reacted with acetyl chloride, (2) the resulting ketone was reduced to the alcohol, and (3) then dehydrated, all in the same manner as described in Example 1, to give benzyl styrene (B.P. 98–120° C. at 0.05 mm.).

EXAMPLE 3

The monomers constituting the final products of Examples 1–2 are polymerized by usual techniques, either with themselves to make homopolymers or with the selected other monomer or monomers to make copolymers. For such polymerization or copolymerization there are mixed with the monomer component, the primary fluor, and the wave shifter in the proportions shown in Example 1 and the process there described for polymerization is followed. An initiator such as benzoyl peroxide, cumene hydroperoxide or t-butyl perbenzoate, in the proportion of 0.01% to 0.1% of the weight of the monomer component, is admixed in advance of the polymerization, if necessary to give a satisfactory rate of polymerization. The whole is then heated in the absence of air or oxygen at a temperature between 40°–150° C. for a period of about 10–72 hours, longer times being required the smaller the proportion of the peroxide used.

EXAMPLE 4

The p-benzyl styrene, made as described in Example 2, was copolymerized and at the same time made into a plastic scintillator as follows:

One hundred parts p-benzyl styrene, 100 parts of vinyl toluene, 6 parts of p-terphenyl (PTP) and 0.1 part of 1,4-di-[2-(5 - phenyloxazolyl)]-benzene (POPOP) were charged to a Pyrex test tube. The test tube was then evacuated to 1 mm. Hg pressure, sealed under vacuum, and maintained at 100° C. by warming or cooling as required for 6 days and then for 24 hours at 170° C. The time period and temperature used are variable, so long as substantially all the monomers used are reacted. The whole was then allowed to cool slowly to room temperature over a period of 8 hours whereafter the Pyrex glass tube was broken away and the cylinder of plastic was released. A piece of this cylinder was milled to a half inch disc and then polished with emery polishing paper. This scintillator containing 3% PTP and 0.05% POPOP gave a pulse height of 55.6.

Tested similarly, the poly(vinyl toluene) when used in amount to equal the total of the copolymer and with the other components of our scintillator showed a pulse height of approximately 48.

EXAMPLE 5

The procedure and compositions of Example 4 was followed except that the p-benzyl styrene was substituted, in turn, by an equimolecular weight of 2,4-, 2,5-, and 2,3-dimethyl styrene used separately and by the corresponding ethyl and propyl substitution products. The products are solids at room temperature and effective scintillators.

EXAMPLE 6

The procedure and composition of Example 5 are used except that the PTP there used is replaced, in turn, by each of the other primary fluors named herein, in equal proportion by weight, and the POPOP by each of the other wave shifters disclosed in equal proportion.

It will be understood that it is intended to cover all changes and modifications of the examples of the invention herein chosen for the purpose of illustration which do not constitute departures from the spirit and scope of the invention.

We claim:

1. A scintillator for detecting and measuring beta and gamma radiation, the scintillator comprising a primary absorber of the radiation, a primary fluor for receiving the radiation from the absorber and transmitting it, and a wave shifter for receiving the radiation transmitted from the primary fluor and emitting the radiation so received as visible light, the primary absorber being a polymer selected from the group consisting of polymeric dimethyl and diethyl styrenes, monobenzyl styrenes, interpolymers thereof, and interpolymers of the monomers represented in the said polymer with approximately equal amounts of styrene and vinyl toluene, the proportions being approximately 0.05–5 parts by weight of the primary fluor and 0.005–1 part of the wave shifter for 100 parts of the primary absorber.

2. The scintillator of claim 1 wherein the primary absorber is a polymeric dialkyl styrene and the alkyl groups therein each have 1–2 carbon atoms.

3. The scintillator of claim 1 wherein the primary absorber is polymeric 3,4-dimethyl styrene.

4. The scintillator of claim 1 wherein the primary absorber is polymeric p-benzyl styrene.

5. The scintillator of claim 1 wherein the primary absorber is the interpolymer of the three monomers 2,3-, 2,4-, and 2,5-dimethyl styrene and each of these monomers being in the proportion of at least about 5 parts by weight for 100 parts total of the said monomers.

References Cited in the file of this patent

UNITED STATES PATENTS 2,710,284    Hyman _____ June 7, 1955